Aug. 20, 1946.　　　　J. H. BLEASE　　　　2,406,129
ANESTHETIZING METERING APPARATUS
Filed Oct. 28, 1943
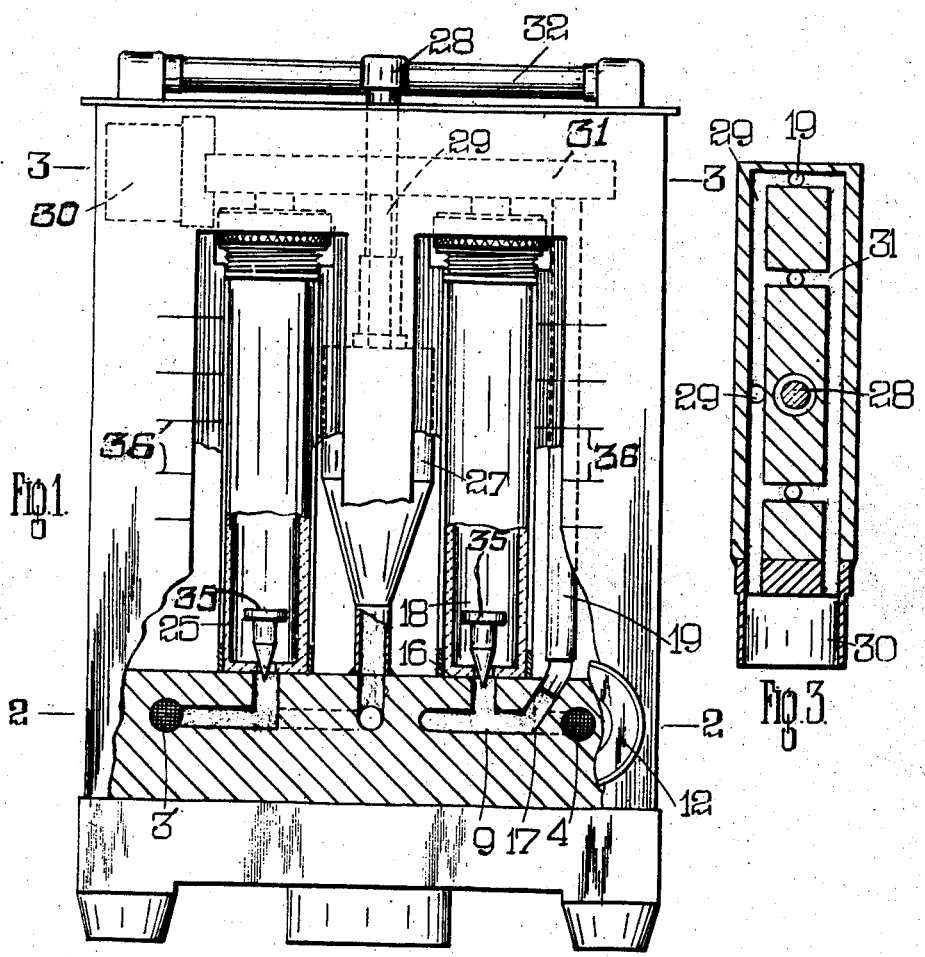
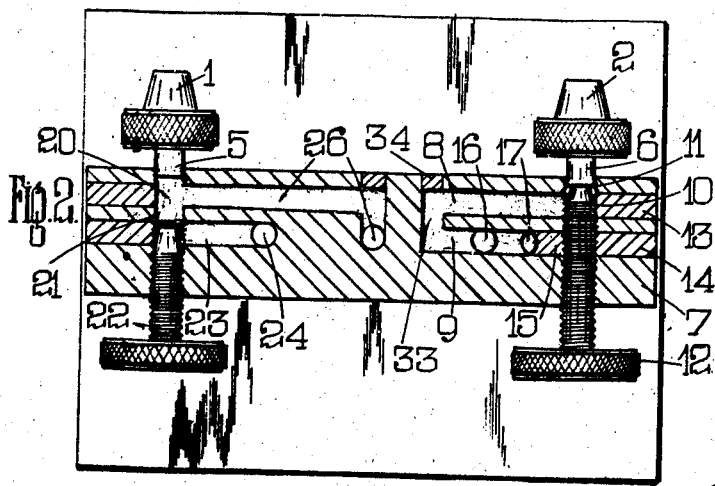
Inventor
John H. Blease
By
Mason, Porter, Diller
Attorneys Patented Aug. 20, 1946

2,406,129

UNITED STATES PATENT OFFICE 2,406,129

ANESTHETIZING METERING APPARATUS

John Henry Blease, Liverpool, England

Application October 28, 1943, Serial No. 508,019
In Great Britain December 11, 1942

2 Claims. (Cl. 73—198)

The present invention relates to improvements in anesthetizing metering apparatus of the type in which a flow meter is provided having a bypass, so that the rate of flow is in fact a function of the scale indications, thereby allowing for a more open scale to be available.

An object of the present invention is to avoid erratic readings of the flow meter where a single valve controls passage through the flow meter and through the bypass.

According to the present invention the passages leading to the flow meter and to the bypass are arranged in sequence to one another from a common inlet passage controlled by the metering valve controlling the supply of nitrous oxide or other anesthetizing gas.

The invention is more particularly described with reference to the accompanying drawing, in which:

Figure 1 is a front elevation, partly in section, of one form of apparatus.

Figure 2 is a sectional plan view on the line 2—2 of Figure 1.

Figure 3 is a sectional plan view on the line 3—3 of Figure 1.

Oxygen and nitrous oxide, or other anesthetizing gas bottles may be connected by flexible tubes to nipples 1, 2, preferably detachable to contain filters 3, 4, these nipples being secured to perforated projections 5, 6, respectively, on the frame 7. This frame is drilled with a pair of bores 8, 9, these bores being cross-drilled, as at 10 and 33, 10 being opposite the perforated projection 6. The end of the projection 6 in the bore 10 is provided with a seating 11 for a metering valve or plug 12. The bore 8 is plugged as at 13, the bore 9 at 14 and 15, and the bore 33 at 34.

Passages 16, 17, respectively lead off to the flow meter 18 and to a bypass tube 19, the passage 17 preferably being drilled at an angle to avoid any sudden change of direction of the flow of the gas to this extension of passage 9 beyond the flow meter connection which would tend to cause irregularity of flow in the passages 8 and 9 leading to the flow meter 18.

Similarly the perforated projection 5 communicates with a lateral bore 20 which has a seating 21 for a metering valve 22 allowing passage, for instance of oxygen, to a passage 23 leading through passage 24 to a flow meter 25. The passage 26 leading from the perforated projection 5 leads to an emergency valve 27 controlled by a press-button 28 which when depressed places the passage 26 in communication with a passage 29 leading to the outlet 30 connecting with the normal face mask or other anesthetizing device. The flow meter 18 and bypass 19 similarly communicate with the passage 31 leading to the connection 30. The connection 30 is coupled by a push-fit sleeve on a rubber tube or the like flexible connection to the face mask. A handle 32 may be provided for transporting the apparatus.

The flow meters 18 and 25 may be of any desired form. In the arrangement shown, when fluid is flowing a loose mushroom-headed pin 35 will be supported in known manner by the column of fluid moving upwardly and will remain poised at a height depending on the rate of flow, so that the rate of flow can be measured by means of the scale 36 at the scale indication lying opposite the top flat side of the mushroom-headed freely displaceable pin.

It will be noted that the flow meter 18 has connection with the common passage 31 at a point between the bypass 19 and the opening of the outlet 30, whereby the flow through meter 18 is characteristic of the total flow and its scale reading indicates this flow: and that the valve 12 controls the flow through the meter 18 and through the bypass 19, in common. The tubes of the meter are very slightly tapered in the usual way so that the diameter is greater at the top than at the bottom but this taper is too small to be shown on the drawing.

I declare that what I claim is:

1. An anesthetizing apparatus having a body structure with a nitrous oxide inlet and an outlet for delivery of gas to the patient, an inlet passage leading from said inlet, a metering valve effective for controlling flow from the inlet into the said inlet passage, a flow meter connected to an intermediate point of the length of said inlet passage, a bypass leading from a point of said passage farther from said inlet than the said flow meter connection, an outlet passage connected to said outlet, a channel connecting said flow meter to said outlet passage at an intermediate point of the length of said outlet passage, said bypass opening into said outlet passage at a point thereof farther from the said outlet than said channel connection, said flow meter and bypass being in parallel to one another and each being effective to provide a communication between said passages with the path of communication from inlet to outlet being shorter through the flow meter than the path through the bypass, said valve providing a common control of gas flow in said flow meter and said bypass.

2. An anesthetizing apparatus having a body structure with a nitrous oxide inlet and an outlet for delivery of gas to the patient, an inlet passage leading from said inlet, a metering valve effective for controlling flow from the inlet into the said inlet passage, a flow meter connected to an intermediate point of the length of said inlet passage, a bypass leading from a point of said passage farther from said inlet than the said flow meter connection, a part of said inlet passage between said flow meter connection and said bypass being inclined at an angle other than a right angle relative to the direction of the part of said inlet passage having said flow meter connection thereon, an outlet passage connected to said outlet, a channel connecting said flow meter to said outlet passage at an intermediate point of the length of said outlet passage, said bypass opening into said outlet passage at a point thereof farther from the said outlet than said channel connection, said flow meter and bypass being in parallel to one another and each being effective to provide a communication between said passages with the path of communication from inlet to outlet being shorter through the flow meter than the path through the bypass, said valve providing a common control of gas flow in said flow meter and said bypass.

JOHN HENRY BLEASE.